United States Patent
Liu

(10) Patent No.: US 11,138,478 B2
(45) Date of Patent: Oct. 5, 2021

(54) METHOD AND APPARATUS FOR TRAINING, CLASSIFICATION MODEL, MOBILE TERMINAL, AND READABLE STORAGE MEDIUM

(71) Applicant: GUANGDONG OPPO MOBILE TELECOMMUNICATIONS CORP., LTD., Guangdong (CN)

(72) Inventor: Yaoyong Liu, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 103 days.

(21) Appl. No.: 16/415,551

(22) Filed: May 17, 2019

(65) Prior Publication Data
US 2019/0377972 A1 Dec. 12, 2019

(30) Foreign Application Priority Data
Jun. 8, 2018 (CN) .......................... 201810588115.5

(51) Int. Cl.
 *G06K 9/62* (2006.01)
 *G06N 3/04* (2006.01)
 *G06N 3/08* (2006.01)

(52) U.S. Cl.
 CPC .......... *G06K 9/627* (2013.01); *G06K 9/6262* (2013.01); *G06N 3/0454* (2013.01); *G06N 3/08* (2013.01)

(58) Field of Classification Search
 CPC .... G06K 9/627; G06K 9/6262; G06K 9/6254; G06K 9/6256; G06K 9/6268; G06N 3/0454; G06N 3/08
 See application file for complete search history.

(56) References Cited

U.S. PATENT DOCUMENTS

| | | | |
|---|---|---|---|
| 9,176,987 B1* | 11/2015 | Peng | G06F 16/5846 |
| 9,704,054 B1* | 7/2017 | Tappen | G06K 9/6281 |
| 10,013,436 B1* | 7/2018 | Cai | G06F 16/5866 |

(Continued)

FOREIGN PATENT DOCUMENTS

| | | |
|---|---|---|
| CN | 105426826 A | 3/2016 |
| CN | 105868243 A | 8/2016 |

(Continued)

OTHER PUBLICATIONS

First Office Action of the Chinese application No. 201810588115.5, dated Mar. 31, 2020.

(Continued)

*Primary Examiner* — Aaron W Carter
(74) *Attorney, Agent, or Firm* — Ladas & Parry, LLP

(57) ABSTRACT

Provided are a method and apparatus for training a classification model, a mobile terminal, and a computer-readable storage medium. The method includes that: a classification model is trained based on a preset data set until the accuracy of the classification model reaches a standard value, wherein data in the preset data set includes label information; data in the preset data set is identified based on the trained classification model to acquire category information of the data; when the category information of the data is not matched with the label information, the data is cleaned to acquire a cleaned target data set; and the classification model is trained again based on the target data set.

16 Claims, 8 Drawing Sheets

(56) References Cited

U.S. PATENT DOCUMENTS

| | | | | |
|---|---|---|---|---|
| 10,474,713 | B1* | 11/2019 | Kim | G06K 9/00684 |
| 2003/0158830 | A1 | 8/2003 | Kowalczyk | |
| 2007/0014439 | A1* | 1/2007 | Ando | G08B 31/00 |
| | | | | 382/118 |
| 2008/0082352 | A1* | 4/2008 | Schmidtler | G06Q 50/18 |
| | | | | 705/2 |
| 2008/0086432 | A1* | 4/2008 | Schmidtler | G06N 20/00 |
| | | | | 706/12 |
| 2008/0086433 | A1* | 4/2008 | Schmidtler | G06N 20/10 |
| | | | | 706/12 |
| 2008/0097936 | A1* | 4/2008 | Schmidtler | G06N 20/00 |
| | | | | 706/12 |
| 2016/0070986 | A1* | 3/2016 | Chidlovskii | G06K 9/6267 |
| | | | | 382/104 |
| 2017/0061330 | A1 | 3/2017 | Kurata | |
| 2018/0089586 | A1* | 3/2018 | Pau | G06K 9/6273 |
| 2018/0373980 | A1* | 12/2018 | Huval | G06K 9/00805 |
| 2019/0073447 | A1* | 3/2019 | Guo | G06F 40/169 |
| 2019/0377949 | A1* | 12/2019 | Chen | G06K 9/00664 |
| 2019/0377972 | A1* | 12/2019 | Liu | G06K 9/6254 |
| 2020/0012894 | A1* | 1/2020 | Lee | G06K 9/00624 |
| 2020/0019816 | A1* | 1/2020 | Zhang | G06K 9/00771 |
| 2020/0074238 | A1* | 3/2020 | Umeno | G06K 9/6215 |
| 2020/0082224 | A1* | 3/2020 | Sikka | G06N 3/084 |
| 2020/0242404 | A1* | 7/2020 | Teshima | G06K 9/6256 |
| 2020/0250491 | A1* | 8/2020 | Peng | G06K 9/6263 |
| 2020/0250497 | A1* | 8/2020 | Peng | G06T 7/0002 |

FOREIGN PATENT DOCUMENTS

| | | |
|---|---|---|
| CN | 105868272 A | 8/2016 |
| CN | 106649610 A | 5/2017 |
| CN | 106845549 A | 6/2017 |
| CN | 106886580 A | 6/2017 |
| CN | 107247972 A | 10/2017 |
| CN | 107392125 A | 11/2017 |
| CN | 107423815 A | 12/2017 |
| CN | 107679580 A | 2/2018 |
| CN | 108009638 A | 5/2018 |
| CN | 108875821 A | 11/2018 |

OTHER PUBLICATIONS

International Search Report in the international application No. PCT/CN2019/089690, dated Aug. 28, 2019.
Written Opinion of the International Search Authority in the international application No. PCT/CN2019/089690, dated Aug. 28, 2019.
Supplementary European Search Report in the European application No. 19177193.0, dated Oct. 24, 2019.
Guyon I et al: "Advances in knowledge discovery and data mining, Discovering Informative Patterns and Data Cleaning", Jan. 1, 1996 (Jan. 1, 1996), Advances in Knowledge Discovery and Data Mining, American Association for Artifical Intelligence, CA, USA, pp. 3-23, XP002497614, ISBN: 978-0-262-56097-9 * figure 4.6 * * p. 11, paragraph 1 * * p. 6, paragraph 2 * * figure 4.4 * * p. 12 *.
Wu Kevin et al: "Learning scene gist with convolutional neural networks to improve object recognition", 2018 52nd Annual Conference on Information Sciences and Systems (CISS), IEEE, Mar. 21, 2018 (Mar. 21, 2018), pp. 1-6, XP033348068, DOI: 10.1109/CISS.2018.8362305 [retrieved on May 21, 2018] * figure 2 *.
Hye-Woo Lee et al: "Deep Neural Network Self-training Based on Unsupervised Learning and Dropout", The International Journal of Fuzzy Logic and Intelligent Systems, vol. 17, No. 1, Mar. 31, 2017 (Mar. 31, 2017), pp. 1-9, XP055632592, ISSN: 1598-2645, DOI: 10.5391/IJFIS.2017.17.1.1 * the whole document *.
Dong-Hyun Lee: "Pseudo-label: the simple and efficient semi-supervised learning method for deep neural networks", Paper submitted at the 30th ICML Workshop in Challenges in Representation Learning (WREPL'13) to be held Jun. 21, 2013, Jun. 13, 2013 (Jun. 13, 2013), XP055210675, Retrieved from the Internet: URL:http://deeplearning.net/wp-content/uploads/2013/03/pseudo_label_final.pdf [retrieved on Sep. 1, 2015] * the whole document *.
Second Office Action of the Chinese application No. 201810588115.5, dated Sep. 15, 2020.
Third Office Action of the Chinese application No. 201810588115.5, dated Dec. 22, 2020.
Office Action of the Indian application No. 201914021942, dated Feb. 23, 2021.
Rejection Decision of the Chinese application No. 201810588115.5, dated Jun. 2, 2021.
First Office Action of the European application No. 19177193.0, dated Jul. 21, 2021.

* cited by examiner

METHOD AND APPARATUS FOR TRAINING, CLASSIFICATION MODEL, MOBILE TERMINAL, AND READABLE STORAGE MEDIUM

CROSS REFERENCE TO RELATED ART

This application claims priority of Chinese Application No. 201810588115.5, filed on Jun. 8, 2018 and named after "METHOD AND APPARATUS FOR TRAINING, CLASSIFICATION MODEL, MOBILE TERMINAL, AND READABLE STORAGE MEDIUM", the contents of which are hereby incorporated by reference in its entirety.

BACKGROUND

Artificial Intelligence (AI) is developed with changes every day. Especially with the wide application of a deep learning technology, AI has made breakthroughs in the fields of object detection and identification. In general, an AI algorithm mainly involves a deep learning technology based on supervised learning, and training data is the driving force of an AI model.

The manners for acquiring training data mainly include open source data sets, network crawling, and offline collection. However, in order to obtain a large amount of data related to a learning task, it is generally necessary to manually filter and classify the data of the open source data set and of the network crawling. In a manual screening stage, a large number of classification errors are often brought due to the large number of people involved and the unevenness of screening and classification criteria. In order to reduce a classification error, the classification error is generally corrected by a multi-level manual review mechanism to ensure data quality, but this method costs a lot of manpower and time, and the data cleaning efficiency is low.

SUMMARY

The present application relates to the field of computer applications, and in particular to a method and apparatus for training a classification model, a mobile terminal, and a computer-readable storage medium.

Embodiments of the present application provide a method and apparatus for training a classification model, a mobile terminal, and a computer-readable storage medium, capable of quickly and efficiently cleaning data, and saving labor costs.

In a first aspect, a method for training a classification model may include the operations as follows.

A classification model is trained based on a preset data set until the accuracy of the classification model reaches a standard value, data in the preset data set comprising label information.

Each of the data in the preset data set is identified based on the trained classification model to acquire category information of each of the data.

When the category information of the data is not matched with the label information, the data is cleaned to acquire a target data set.

The classification model is trained again based on the target data set.

In a second aspect, an apparatus for training a classification model may include a memory and a processor. The memory may store a computer program. The computer program may be executed by the processor to enable the processor to perform the steps of the method for training a classification model, as described above.

In a third aspect, a mobile terminal may at least include the apparatus for training a classification mode as described above.

In a fourth aspect, a computer-readable storage medium may have a computer program stored thereon. The computer program may be executed by a processor to implement the steps of the method for training a classification model.

It is to be understood that the above general descriptions and detailed descriptions below are only exemplary and explanatory and are not restrictive of the present disclosure.

BRIEF DESCRIPTION OF DRAWINGS

In order to describe the technical solutions in the embodiments of the present application more clearly, the drawings in descriptions about the embodiments or the conventional art will be simply introduced below. The drawings in the following descriptions are only some embodiments of the present application.

DETAILED DESCRIPTION

In order to make the objectives, technical solutions and advantages of the present application clearer, the present application will be further elaborated below in conjunction with the drawings and the embodiments. It will be appreciated that specific embodiments described here are only used to explain the present application, not to limit the present application.

Figure 1:
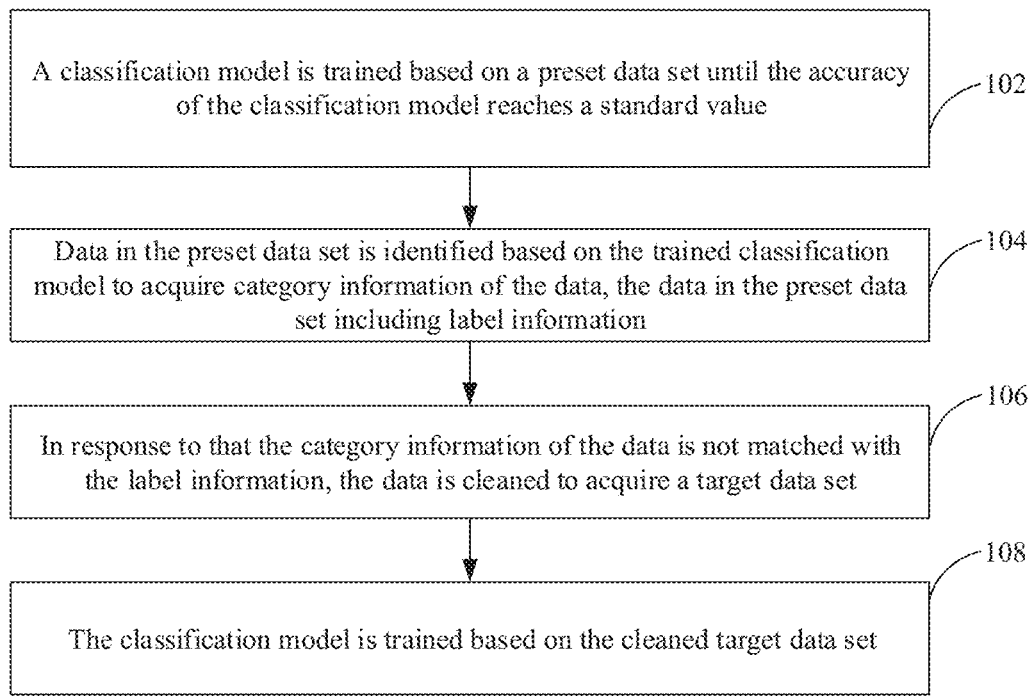
FIG. 1 is a flowchart of a method for training a classification model in one embodiment.

FIG. 1 is a flowchart of a method for training a classification model in one embodiment. As shown in FIG. 1, the method for training a classification model includes step 102 to step 106.

At step 102, a classification model is trained based on a preset data set until the accuracy of the classification model reaches a standard value, data in the preset data set including label information.

The constructed preset data set may be pre-stored in a terminal or a server. The preset data set may include a large amount of data sufficient for training the classification model, and the data may be image data, video data, text data, voice data, or the like. In the present application, the data included in the preset data set is image data, that is, the image data is taken as an example for description. Based on a learning task that needs to be trained, each of the data includes label information which is manually labeled, that is, the label information represents a label manually assigned to the image data. The label information may include at least one of an image category or an object category. The image category may be understood as a training target in a background region in the image data, such as landscape, beach, snow, blue sky, green space, night scene, darkness, backlight, sunrise/sunset, indoor, fireworks, and spotlights. The object category may be a training target in a foreground region in the image data, such as portraits, babies, cats, dogs, and food. In addition, the background training target and the foreground training target may also be text documents, microspur, and the like.

Specifically, the classification model is a neural network model, and the neural network model may be a neural network model at least including one input layer, n intermediate layers and two output layers. The intermediate layer may be configured as an image feature extraction layer, the $j^{th}$ intermediate layer may be cascaded to a first branch of the neural network model, and the $k^{th}$ intermediate layer may be cascaded to a second branch of the neural network model, where i is less than j, j is less than k, i, j, k, and n are positive integers, and i, j and k are all smaller than n. One output layer may be located in the first branch, and the other output layer may be located in the second branch. A first output of the first branch of the neural network model may output a first confidence when image detection is performed by the neural network model, the first confidence indicating the confidence of a specified image category to which a background image detected by the neural network model belongs. A second output of the second branch of the neural network model may output a parameter about an offset of each preselected default bounding box relative to a real bounding box corresponding to a specified object, and may output a second confidence to which a specified object category belongs when image detection is performed by the neural network model.

In statistics, a confidence interval of a probability sample is an interval estimate of a certain population parameter of the probability sample. The confidence interval shows an extent to which the true value of this parameter has a certain probability of falling around a measurement result. The confidence is the credibility of a measured value of the measured parameter.

The data may be divided into a training set and a test set according to a preset ratio in the preset data set. The classification model may be trained on the training set, and the data of the test set may be tested based on the trained classification model to acquire a test identification rate of the classification model, that is, the accuracy (performance) of the classification model, until the accuracy of the training model reaches a standard value, such as 80% or other values. When the accuracy of the classification model reaches 80%, it is indicated that the classification model can be used to classify and identify any image data, and the identification effect can achieve the desired effect.

At step 104, the data in the preset data set is identified based on the trained classification model to acquire category information of the data.

When the accuracy of the trained classification model reaches a label value, each of the data in the preset data set is identified based on the trained classification model, and the category information of each of the data is acquired. When the classification model is a neural network model, the neural network model may be used to perform classification detection on a background of image data to output a first confidence map, and perform target detection on a foreground of the image data to output a second confidence map. Each pixel point in the first confidence map represents a confidence of each pixel point in the image data belonging to a background detection target, and each pixel point in the second confidence map represents a confidence of each pixel point in the image data belonging to a foreground detection target; weighting is performed based on the first confidence map and the second confidence map to obtain a final confidence map of the image data; and category information of the image data is determined based on the final confidence map.

The category information may include at least one of an image category or an object category. The image category may be understood as a training target in a background region in the image data, such as landscape, beach, snow, blue sky, green space, night scene, darkness, backlight, sunrise/sunset, indoor, fireworks, and spotlights. The object category may be a training target in a foreground region in the image data, such as portraits, babies, cats, dogs, and food. In addition, the background training target and the foreground training target may also be text documents, microspur, and the like. It is to be noted that the background region refers to a background portion of the image data, and the foreground region refers to a foreground portion of the image data.

Figure 2:
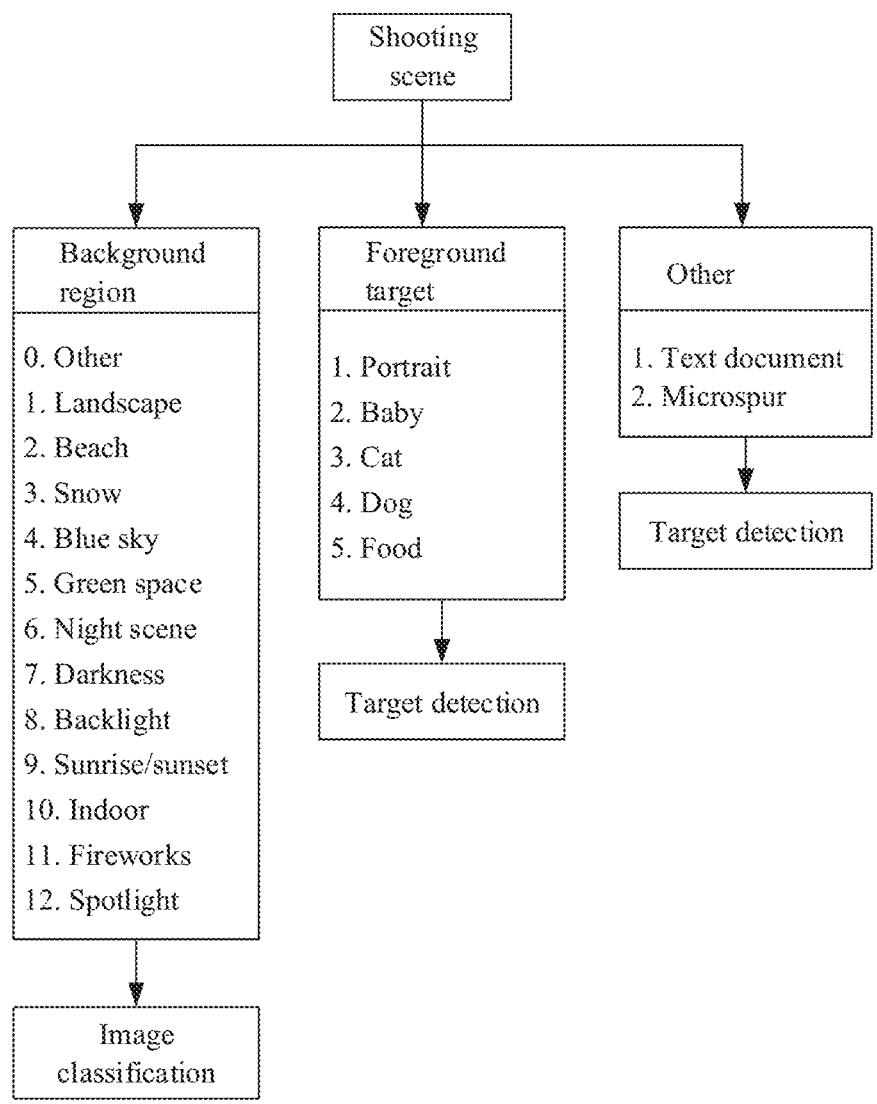
FIG. 2 schematically shows a category diagram of a shooting scene in one embodiment.

As shown in FIG. 2, a shooting scene of the image data may include an image category of the background region, an object category of the foreground region, and others. The image category of the background region may include landscape, beach, snow, blue sky, green space, night scene, darkness, backlight, sunrise/sunset, indoor, fireworks, spotlights, etc. The object category of the foreground region may be portraits, babies, cats, dogs, foods, etc. Others may be text documents, microspur, etc.

It will be appreciated that the category information has the same meaning as the label information. If the accuracy of the classification model reaches a target value, the label information of the same image data is required to be matched with the category information identified by the classification model.

At step 106, in response to that the category information of the data is not matched with the label information, the data is cleaned to acquire a target data set.

Each of the data in the preset data set has label information, which is formed based on manual labeling. Moreover, based on the trained classification model, each of the data in the preset data set may be identified and the corresponding category information may be acquired. For the same data, the label information and category information of the data are acquired and compared, and when the category information of the data is not matched with the label information, the data is cleaned to acquire a target data set.

It is to be noted that the category information has the same meaning as the label information. If the accuracy of the classification model reaches a target value, the label information of the same image data is required to be matched with the category information identified by the classification model.

Specifically, when the category information is not matched with the label information, the correctness of the label information and the category information is first determined; and the data is cleaned based on the correctness of the label information and the category information. Data cleaning includes operations such as correcting the label information, deleting original data, and adding new data. The data of the preset data set is cleaned to form a target data set, so that data of the target data set may include correct label information. The quality of each of the data in the target data set may be ensured, and a multi-level manual review mechanism is not required for guaranteeing data quality, thereby greatly saving labor costs, and improving data cleaning efficiency.

At step 108, the classification model is trained based on the target data set.

A mobile terminal may train the classification model again based on the target data set. The manner of training the classification model again is the same as the manner of training the classification model in step 102, and will not be described again here. Since the quality of each of the data input into the classification model is ensured, the performance of the classification model can be improved, and the accuracy reliability of the classification model can be improved.

According to the method for training a classification model, a classification model is trained based on a preset data set until the accuracy of the classification model reaches a standard value, data in the preset data set including label information; each of the data in the preset data set is identified based on the trained classification model to acquire category information of each of the data; when the category information of the data is not matched with the label information, the data is cleaned to acquire a cleaned target data set; and the classification model is trained again based on the target data set. The quality of each of the data in a target data set may be ensured based on a semi-automatic cleaning mode, so that data quality does not need to be ensured by a multi-level manual review mechanism, thereby greatly saving labor costs, and improving data cleaning efficiency. Moreover, a classification model is trained based on the target data set, so that the accuracy and performance of the classification model can be improved.

Figure 3:
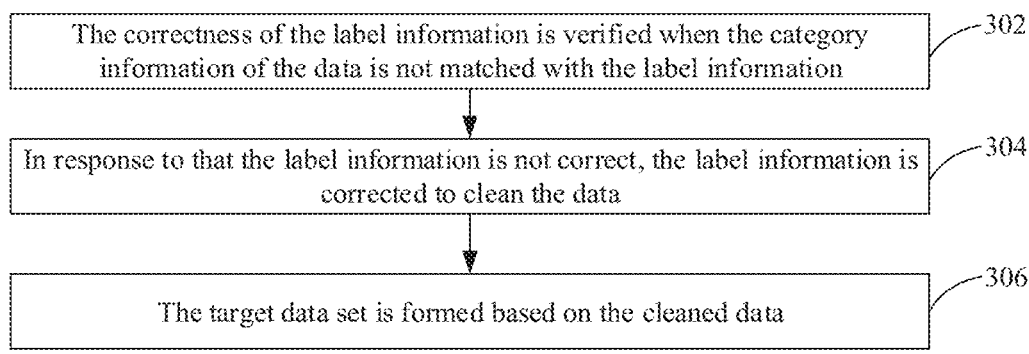
FIG. 3 is a flowchart of cleaning, when category information of data is not matched with label information, the data to acquire a target data set in one embodiment.

FIG. 3 is a flowchart of cleaning, in response to that category information of data is not matched with label information, the data to acquire a target data set in one embodiment. In one embodiment, when the category information of the data is not matched with the label information, the data is cleaned to acquire a cleaned target data set, as shown in step 302 to step 306.

At step 302, the correctness of the label information is verified in response to that the category information of the data is not matched with the label information.

Based on step 104, each of the data in the preset data set is identified based on the trained classification model to acquire category information of each of the data. The category information of each of the data in the preset data set can be acquired. The category information includes an image category and/or an object category, that is, the category information may include the image category only (the data includes a training object in the background region only, such as a beach); the category information may include the object category only (the data includes a training object in the foreground region only, such as food); and the category information may include both the image category and the object category (the data includes both the training target in the background region and the training target in the foreground region, such as a beach and a portrait).

The terminal may also acquire label information of the data. The label information is manually filtered and labeled when the preset data set is formed. Correspondingly, the label information includes an image category and/or an object category. That is, the label information may be the image category, such as landscape, beach, snow, or blue sky; the label information may also be the object category, such as portrait, portrait+baby, or portrait+cat; and the label information may also include the image category and the object category, such as portrait+landscape, portrait+sunset, or portrait+spotlight.

The category information of the same data is compared with the label information. It is determined whether the category information is matched with the label information. The correctness of the label information is further verified when the category information is not matched with the label information.

In the process of manual labeling, there are many manual operations involved in labeling, and the labeling standards are uneven, which may cause the label information to be incorrectly labeled. In addition, in the process of automatic labeling using the trained model, when the accuracy of the classification model does not reach 100%, the label information may also be caused to be incorrectly labeled. In view of this, the correctness of the label information of the data can be verified by manual verification. When the label information included in the preset data set is matched with the present manual verification-based label information, it is indicated that the label information is correct. It is to be noted that the present manual verification-based label information may refer to the image data manually labeled again at the present moment.

For example, the label information included in the data is beach+portrait, the present manual verification-based label information is beach+portrait, and it is indicated that the label information is correct at the moment; and the label information included in the data is night scene+portrait, the present manual verification-based label information is backlight+portrait, and it is indicated that the label information is incorrect at the moment.

At step 304, when the label information is not correct, the label information is corrected to clean the data.

When the label information is incorrect, the label information needs to be corrected, that is, the label information included in the data is corrected to become the present manual verification-based label information, thereby achieving the purpose of cleaning the data. For example, the label information included in the data is night scene+portrait, and the present manual verification-based label information is backlight+portrait. At this moment, the label information is incorrect, and the label information (night scene+portrait) included in the data may be corrected to become the present manual verification-based label information (backlight+portrait).

At step 306, the target data set is formed based on the cleaned data.

Based on step 304, all the data with incorrect label information in the preset data set may be corrected, and each of the data in the preset data set may be cleaned, so that each of the data includes the correct label information. Then, after the data in the preset data set is cleaned, a target data set may be formed. The quality of each of the data in a target data set may be ensured based on a semi-automatic cleaning mode, so that data quality does not need to be ensured by a multi-level manual review mechanism, thereby greatly saving labor costs, and improving data cleaning efficiency. Moreover, a classification model is trained based on the target data set, so that the accuracy and performance of the classification model can be improved.

Figure 4:
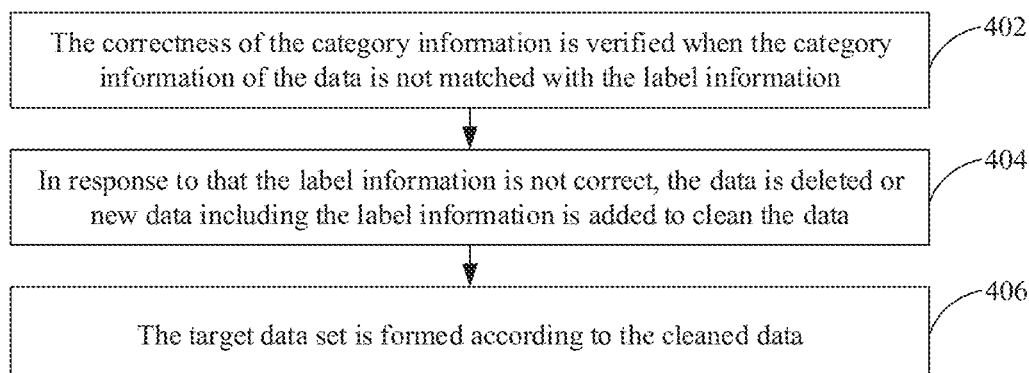
FIG. 4 is a flowchart of cleaning, when category information of data is not matched with label information, the data to acquire a target data set in another embodiment.
Figure 5:
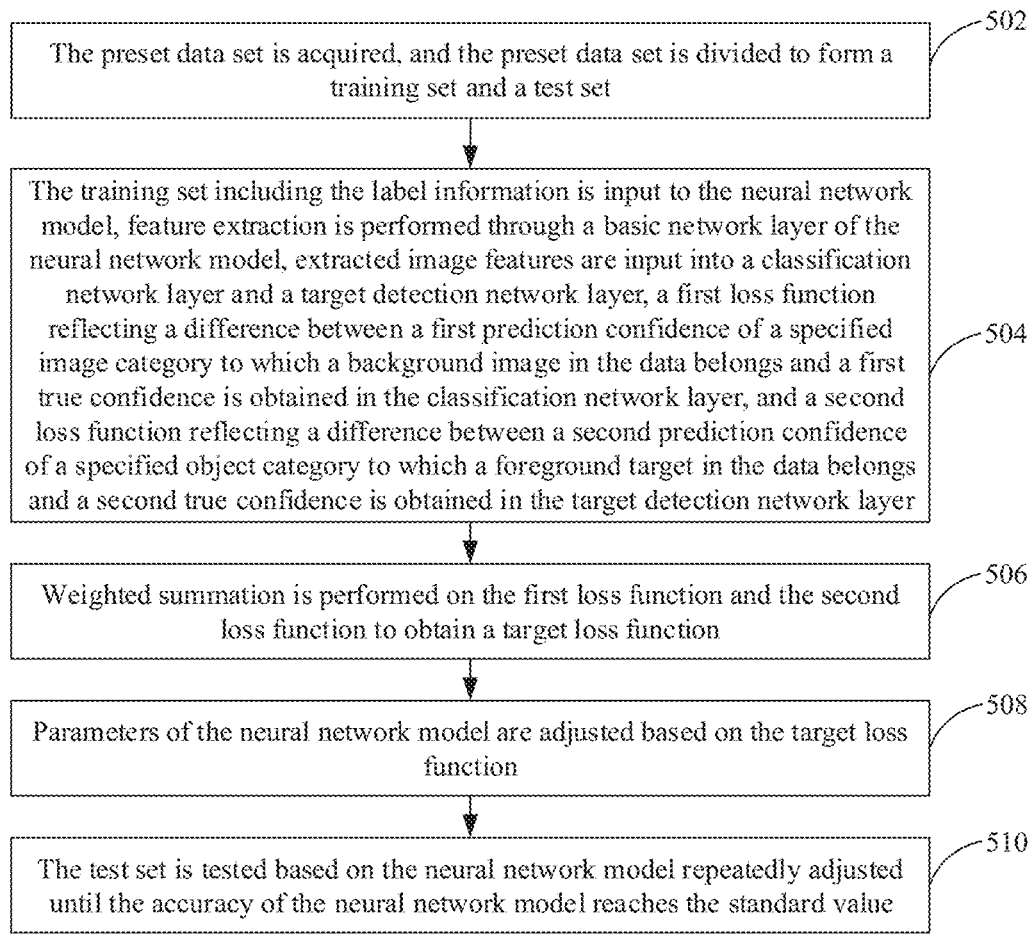
FIG. 5 is a flowchart of training a classification model based on a preset data set until the accuracy of the classification model reaches a standard value in one embodiment.

FIG. 4 is a flowchart of cleaning, when category information of data is not matched with label information, the data to acquire a target data set in another embodiment. In one embodiment, when the category information of the data is not matched with the label information, the data is cleaned to acquire a cleaned target data set, as shown in step 402 to step 406.

At step 402, the correctness of the category information is verified in response to that the category information of the data is not matched with the label information.

The category information of the same data is compared with the label information, and it is determined whether the category information is matched with the label information. The correctness of the category information is further verified when the category information is not matched with the label information.

The category information is an identification result of the data, the identification result being output from the trained classification model. When the accuracy of the classification model does not reach 100%, there is still a small probability that the identification result is wrong. The correctness of the label information is manually verified when the category information is not matched with the label information.

Specifically, before verifying the correctness of the category information, it is required to preferentially verify whether the label information is correct. The correctness of the category information continues to be verified only if the label information is correct. That is, when the category information is not matched with the label information, the priority of verifying the label information is higher than the priority of verifying the category information. Thus, the misjudgment of the classification model caused by wrong label information can be avoided.

When the label information is correct, the correctness of the category information of the data can be verified by manual verification. When the category information is matched with the label information, it is indicated that the category information is correct; and when the category information is not matched with the label information, it is indicated that the category information is incorrect. The situation that the category information is incorrect may include that the classification model does not identify the category information of the data, or that the classification model identifies the category information of the data, but the category information is not matched with the label information.

At step 404, in response to that the label information is not correct, the data is deleted or new data including the label information is added to clean the data.

The situation that the category information is incorrect may include that the classification model does not identify the category information of the data, or that the classification model identifies the category information of the data, but the category information is not matched with the label information.

When the classification model does not identify the category information of the data, it may be indicated that the data itself is wrong, that is, the data is data that is not associated with the learning task. In this case, the data may be deleted to clean the preset data set.

In a case that the classification model identifies the category information of the data, but the category information is not matched with the label information, it is indicated that the accuracy of the classification model does not reach 100%, and wrong identification with a low probability occurs. For example, the accuracy of the classification model reaches 80% of the standard value, that is, there is a possibility of 20% that an identification error occurs. At this moment, it is possible to continue to add new data including the correct label information to the preset data set to optimize the preset data set, and the classification model is further trained to improve the accuracy of the classification model. Optionally, the data may not be processed. After the classification model is trained again based on the target data set formed in step 306, step 104 to step 108 are repeatedly performed.

At step 406, the target data set is formed based on the cleaned data.

Based on step 304, all the data with incorrect label information in the preset data set may be corrected, and each of the data in the preset data set may be cleaned, so that each of the data includes the correct label information. Then, after the data in the preset data set is cleaned, a target data set may be formed. The quality of each of the data in a target data set may be ensured based on a semi-automatic mode, so that data quality does not need to be ensured by a multi-level manual review mechanism, thereby greatly saving labor costs, and improving data cleaning efficiency. Moreover, a classification model is trained based on the target data set, so that the accuracy and performance of the classification model can be improved.

In one embodiment, the classification model is a neural network model. The classification model is trained based on a preset data set until the accuracy of the classification model reaches a standard value, as shown in step 502 to step 508.

At step 502, the preset data set is acquired, and the preset data set is divided to form a training set and a test set.

The preset data set is acquired based on a learning task. The learning task may be understood as an ultimate identification target of the classification model, that is, training of the classification model. Based on the learning task, a large amount of data may be acquired by a web crawler technology and/or an open source data set, and the acquired data is manually labeled, that is, a label is set for the data, so that each of the data includes label information. The label information includes an image category and/or an object category. For example, in the image data, only a portrait region is included, therefore, the label information of the image data is a portrait; if a panoramic region in the image data is a beach, the label information of the image data is a beach; if a background region in the image data is a sunrise and a foreground region is a portrait, the label information of the image data is sunrise and portrait. Moreover, the quantity of data in the preset data set can meet the requirements of training the classification model.

Further, the quantity of the image categories and the quantity of the object categories are kept within a proper range. For example, the quantity of image data of each category including label information may be kept in the range of 8000 to 10000, so that the comprehensive quality of each category of image data after being trained by the classification model can be ensured, thereby avoiding the influence on the training effect of its own category or other categories caused by more or fewer image data of a certain category in the preset data set.

The mobile terminal may divide the data in the preset data set into a training set and a test set according to a preset ratio. For example, the preset ratio of the quantity of image data in the training set to the quantity of image data in the test set may be set to 9:1, that is, the ratio of the quantity of data in the training set to the quantity of data in the test set is 9:1. Of course, the preset ratio may be set based on actual needs, and no further limitation is made here.

At step 504, the training set including the label information is input to the neural network model feature extraction is performed through a basic network layer of the neural network model; extracted image features are input into a classification network layer and a target detection network layer; a first loss function reflecting a difference between a first prediction confidence of a specified image category to which a background image in the data belongs and a first true confidence is obtained in the classification network layer, and a second loss function reflecting a difference between a second prediction confidence of a specified object category to which a foreground target in the data belongs and a second true confidence is obtained in the target detection network layer.

Specifically, an image data including label information in the training set may be input into a neural network model to obtain a first loss function reflecting a difference between a first prediction confidence of each pixel point of a background region in the image data and a first true confidence and obtain a second loss function reflecting a difference between a second prediction confidence of each pixel point of a foreground region in the image data and a second true confidence. The first prediction confidence is a confidence that a certain pixel point of the background region in the image data predicted by the neural network model belongs to a background training target. The first true confidence indicates a confidence that the pixel point pre-labeled in the image data belongs to the background training target. The second prediction confidence is a confidence that a certain pixel point of the foreground region in the image data predicted by the neural network model belongs to a foreground training target. The second true confidence indicates a confidence that the pixel point pre-labeled in the image data belongs to the foreground training target.

In the process of training the neural network model, the image data including the label information in the training set may be input into the neural network model. The neural network model performs feature extraction based on the background training target and the foreground training target. Features are extracted by Scale-Invariant Feature Transform (SIFT), Histogram of Oriented Gradient (HOG) or the like. Then the background training target is detected by a target detection algorithm such as a Single Shot MultiBox Detector (SSD), a Visual Geometry Group (VGG), and a Convolutional Neural Network (CNN) to obtain a first prediction confidence; and the foreground training target is detected by the above target detection algorithm to obtain a second prediction confidence. The first prediction confidence is a confidence that a certain pixel point of a background region in the image data predicted by the neural network model belongs to the background training target. The second prediction confidence is a confidence that a certain pixel point of a foreground region in the image data predicted by the neural network model belongs to the foreground training target.

The background training target and the foreground training target may be pre-labeled in the image data to obtain a first true confidence and a second true confidence. The first true confidence indicates a confidence that the pixel point pre-labeled in the image data belongs to the background training target. The second true confidence indicates a confidence that the pixel point pre-labeled in the image data belongs to the foreground training target. For each pixel in the image, the true confidence may be expressed as 1 (or positive) and 0 (or negative), respectively, to indicate that the pixel point belongs to a training target and does not belong to the training target.

A difference between the first prediction confidence and the first true confidence is calculated to obtain a first loss function, and a difference between the second prediction confidence and the second true confidence is calculated to obtain a second loss function. Both the first loss function and the second loss function may employ a logarithmic function, a hyperbolic function, an absolute value function, and the like.

For each or more pixel points in the image data, a neural network model may be utilized to predict a confidence for the training target.

At step 506, weighted summation is performed on the first loss function and the second loss function to obtain a target loss function.

Firstly, the first loss function and the second loss function are respectively provided with corresponding weight values, and the weight values may be adjusted based on the identification scene. The first loss function is multiplied by a first weight value a, the second loss function is multiplied by a second weight value b, and then the two products are summed to obtain a target loss function.

At Step 508, Parameters of the Neural Network Model are Adjusted Based on the Target Loss Function.

Specifically, the parameters of the neural network model refer to the weight values of each network layer. The parameters of the neural network model are adjusted using the target loss function, so that the first loss function and the second loss function are minimized, that is, the difference between the prediction confidence of a pixel point and the true confidence is minimized, or the sum of the differences between the prediction confidence and the true confidence of each pixel point is minimized, thereby obtaining a trained neural network model. For the target loss function adjusting the parameters of the neural network model, the parameters of each network layer can be adjusted step by step through a back propagation algorithm.

At step 510, the test set is tested based on the neural network model repeatedly adjusted until the accuracy of the neural network model reaches the standard value.

The image data including the label information in the test set is input to the neural network model after the parameters are adjusted, and the neural network model is value-evaluated to acquire the accuracy of the trained neural network model. The accuracy may also be understood as the test identification rate of the neural network model for each of the data in the test set. The higher the identification rate, the higher the accuracy, and the better the performance of the trained neural network model.

In the present embodiment, the target loss function is obtained by weighted summation for the first loss function corresponding to the background training target and the second loss function corresponding to the foreground training target, and the parameters of the neural network model are adjusted based on the target loss function, so that the trained neural network model may simultaneously identify an image category and an object category. More information is acquired, and higher identification efficiency is achieved.

Figure 6:
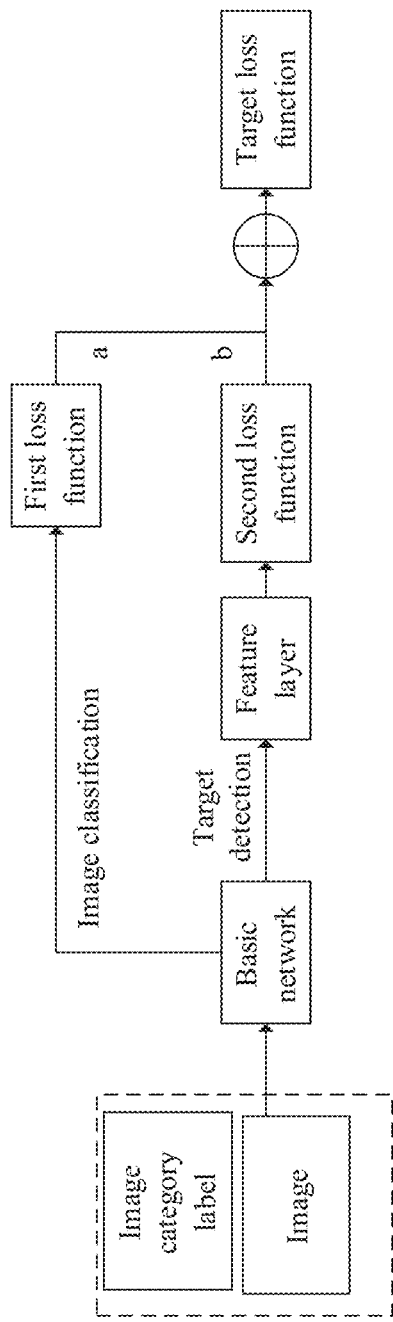
FIG. 6 schematically shows a structure diagram of a neural network model in one embodiment.

FIG. 6 schematically shows a structure diagram of a neural network model in one embodiment. As shown in FIG. 6, an input layer of a neural network model receives image data including label information, performs feature extraction through a basic network (such as a CNN), and outputs the extracted image features to a feature layer. The feature layer detects a background training target to obtain a first loss function, detects a foreground training target to obtain a second loss function, and performs weighted summation on the first loss function and the second loss function to obtain a target loss function.

Figure 7:
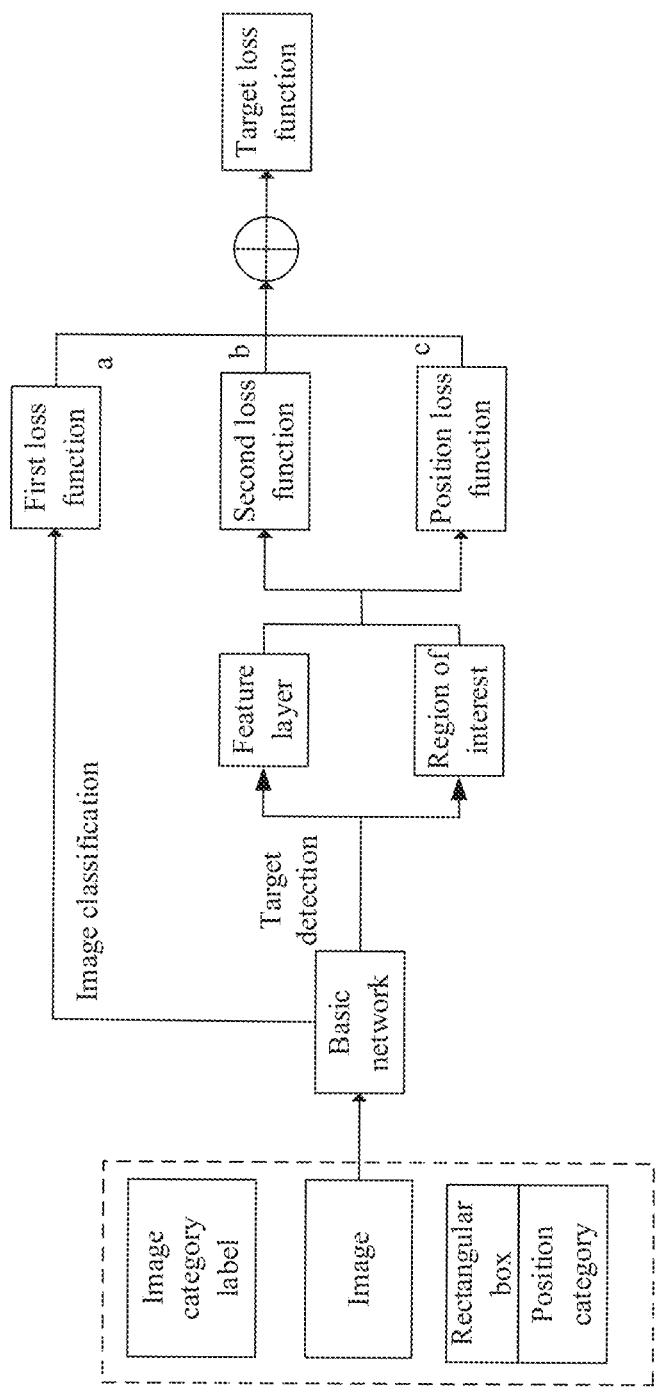
FIG. 7 schematically shows a structure diagram of a neural network model in another embodiment.

FIG. 7 schematically shows a structure diagram of a neural network model in another embodiment. As shown in FIG. 7, an input layer of a neural network model receives image data including label information, performs feature extraction through a basic network (such as a CNN), and outputs the extracted image features to a feature layer. The feature layer performs category detection on a background training target to obtain a first loss function, performs category detection on a foreground training target based on the image features to obtain a second loss function, performs position detection on the foreground training target based on a foreground region to obtain a position loss function, and performs weighted summation on the first loss function, the second loss function and the position loss function to obtain a target loss function. The neural network model may be a CNN. The CNN may include a data input layer, a convolution calculation layer, an activation layer, a pooling layer, and a fully connected layer. The data input layer may be configured to pre-process original image data. The pre-processing may include de-averaging, normalization, dimensionality reduction, and whitening. The de-averaging refers to centering each dimension of the input data to 0 in order to pull the center of a sample back to an origin of a coordinate system. The normalization is to normalize the amplitude to the same range. The whitening refers to the normalization of the amplitude of each feature axis of the data. The convolution calculation layer is used for local association and window sliding. The weight of each filter in connection with a data window in the convolution calculation layer is fixed. Each filter focuses on an image feature such as vertical edges, horizontal edges, colors, and textures, and these filters are combined to obtain a feature extractor assembly of an entire image. A filter is a weight matrix. A weight matrix may be used to convolve with data in different windows. The activation layer is used to nonlinearly map an output result of the convolution layer. An activation function used by the activation layer may be a Rectified Linear Unit (ReLU). The pooling layer may be sandwiched between successive convolution layers to compress the amount of data and parameters and reduce over-fitting. The pooling layer may reduce the dimensions of the data by a maximum value method or an average value method. The fully connected layer is located at the end of the convolutional neural network model, and there are weight connections between all neurons between the two layers. Some convolution layers of the convolutional neural network model are cascaded to a first confidence output node, some convolution layers are cascaded to a second confidence output node, some convolution layers are cascaded to a position output node. The background classification of an image may be detected based on the first confidence output node, the category of a foreground target of the image may be detected based on the second confidence output node, and a position corresponding to the foreground target may be detected based on the position output node.

Figure 8:
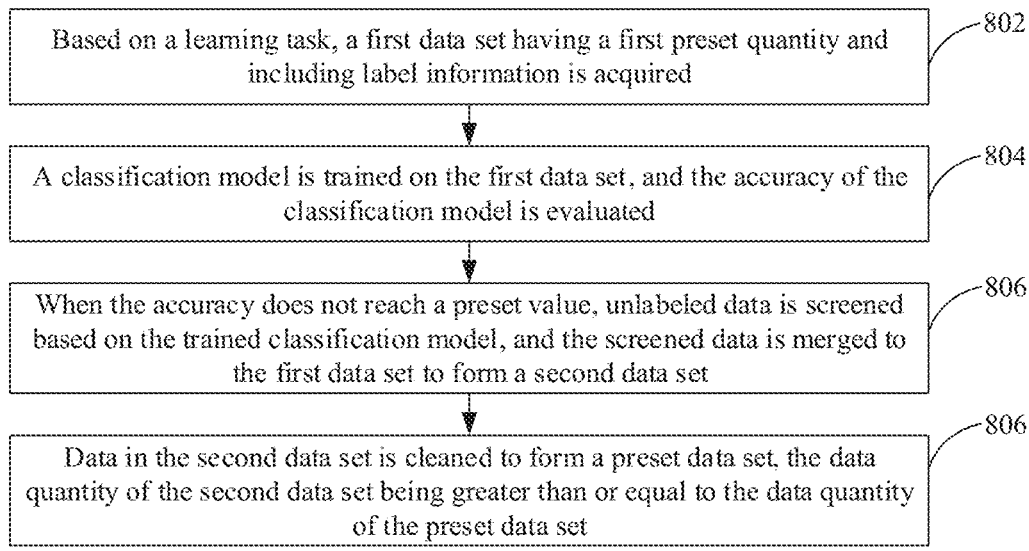
FIG. 8 is a flowchart of acquiring a preset data set in one embodiment.

FIG. 8 is a flowchart of acquiring a preset data set in one embodiment. In one embodiment, the step of acquiring the preset data set includes step 802 to step 804.

At step 802, based on a learning task, a first data set having a first preset quantity and including label information is acquired.

The learning task may be understood as an ultimate identification target of the classification model, that is, training of the classification model. Based on the learning task, the category information of data to be acquired, that is, an image category and an object category, may be defined. Based on the defined category information, a large amount of data may be acquired using a web crawler technology and/or an open source data set, and the acquired data is manually screened, classified and labeled, that is, a label is set for the data, so that each of the data includes label information. The label information includes at least one of the image category or the object category. That is, the label information may be the image category, such as landscape, beach, snow, or blue sky; the label information may also be the object category, such as portrait, portrait+baby, or portrait+cat; and the label information may also include the image category and the object category, such as portrait+landscape, portrait+sunset, or portrait+spotlight. The label information is associated with the training task of the classification model, and the accuracy of the label information affects the accuracy of the classification model. The classification model training needs to input the first data set including the label information at the same time, and the classification model is trained based on the learning task.

The data quantity of each image category and the data quantity of each object category may be within a preset range and may be equal or unequal. The specific value of the quantity may be set based on actual needs. For example, it may be set to 2000 or other values, and image data having a first preset quantity may be screened by manual screening and classification.

At step 804, a classification model is trained on the first data set, and the accuracy of the classification model is evaluated.

Specifically, the classification model may be a neural network model. The mobile terminal may divide the image data of the first data set into a training set and a test set based on a preset ratio, input the label information and image data of the training set to an input layer of the neural network model, train the neural network model, and then adjust the parameters of the neural network model. The image data and label information of the test set are simultaneously input to the neural network model after the parameters are adjusted, the identification rate of test of the trained neural network model over the test set in the first data set is acquired, that is, the neural network model is value-evaluated to acquire the accuracy of the trained neural network model. The step is the same as the embodiment of step 102 in the foregoing embodiment, and details are not described herein again.

At step 806, when the accuracy does not reach a preset value, unlabeled data is screened based on the trained classification model, and the screened data is merged to the first data set to form a second data set.

Since the quantity of image data in the first data set is small, tens to hundreds of thousands of image data are required in order to optimize the performance of the classification model, and if all the data is collected by human resources and the data is labeled, it will be time-consuming, inefficient and costly. When the test accuracy of data in the test set by the classification model reaches a preset value, it may be indicated that the trained classification model has better performance and may be used for classifying and screening the image data. Based on the trained classification model, a large number of unlabeled image data acquired by the network may be identified, screened and labeled. Moreover, the image data identified by the trained classification model is labeled and merged into the first data set to form a second data set. In the image data identified by the classification model, the quantity of image data of each image category and the quantity of image data of each object category are within a preset range, and may be the same or different. Moreover, the sum of the image data of each image category and the image data of each object category is greater than the target quantity of the target data set, that is, the quantity of image data of the second data set is greater than the target quantity of image data of the preset data set.

A large number of unlabeled image data acquired by the network may be screened, classified and labeled through the trained classification model, which can avoid a large amount of manpower from screening and classifying the image data, thereby greatly improving the efficiency of acquiring a data set in complication with the learning task.

At step 808, data in the second data set is cleaned to form a preset data set, the data quantity of the second data set being greater than or equal to the data quantity of the preset data set.

Irrelevant data and duplicate data in the second data set may be deleted and noise data may be smoothed by data cleaning, that is, data unrelated to the learning task is deleted, missing values and outliers are processed, and a preset data set is further acquired. The data in the preset data set may be made to meet a preset requirement by data cleaning, that is, each of the data is data that is highly correlated with the training model; and the retained data amount of the preset data set reaches the target quantity. In the preset data set, the quality and quantity of the image data of each image category and each object category may reach the preset requirement. For example, the quantity of the image data of each image category and each object category ranges from 5000 to 10000. In this way, the target data set composed of image data of each image category and each object category may contain tens of thousands to hundreds of thousands of data.

According to the method in the present embodiment, in the process of acquiring a preset data set, a classification model may be trained based on a first data set, and then the trained classification model is used to screen, classify and automatically label a large amount of unlabeled data. The number of manual classification labels can be reduced, and labeling costs are saved. Moreover, the efficiency and quality of acquiring the preset data set conforming to a learning task are improved.

Figure 9:
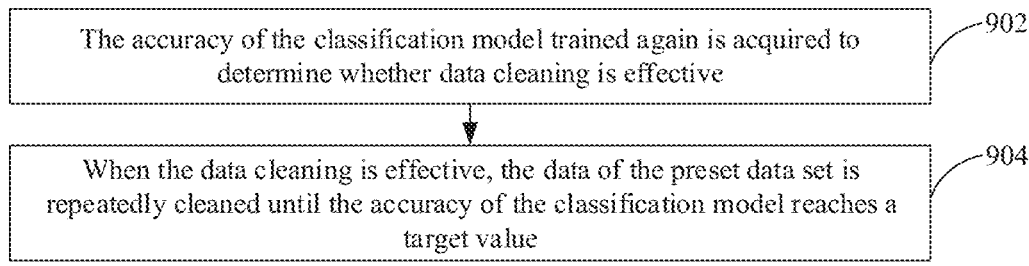
FIG. 9 is a flowchart of a method for training a classification model in another embodiment.

FIG. 9 is a flowchart of a method for training a classification model in another embodiment. In one embodiment, after training the classification model again based on the target data set, the method may further include the steps as follows.

At step 902, the accuracy of the classification model trained again is acquired to determine whether data cleaning is effective.

The classification model is trained again based on the target data set, the accuracy of the present trained classification model is acquired, and it is determined whether data cleaning is effective in step 106. That is, when the accuracy of training the classification model again based on the target data set is higher than the standard value, the data cleaning in step 106 may be considered to be effective.

At step 904, when the data cleaning is effective, the data of the preset data set is repeatedly cleaned until the accuracy of the classification model reaches a target value.

When the data cleaning is effective, the data of the preset data set may be repeatedly cleaned until the accuracy of the classification model trained for many times reaches a target value. That is, when the data cleaning is effective, step 104 to step 108 may be repeatedly performed to repeatedly clean the data in the target data set, so that each of the data in the target data set has high-quality. Then, a high-quality data set is provided for the classification model, so that the accuracy of the classification model can be improved.

It is to be understood that although various steps in the flowchart in FIG. 1 to FIG. 5, FIG. 8 and FIG. 9 are displayed in sequence based on the indication of arrows, these steps are not necessarily performed in the sequence indicated by the arrows. Unless expressly stated herein, there is no strict sequence limitation to these steps, which may be performed in other sequences. Moreover, at least some steps in FIG. 1 to FIG. 5, FIG. 8 and FIG. 9 may include multiple sub-steps or multiple stages, these sub-steps or stages are not necessarily completed at the same moment but may be performed at different moments, and these sub-steps or stages are not necessarily performed in a sequence but may be performed in turns or alternately with at least some of other steps or sub-steps or stages of the other steps.

Figure 10:
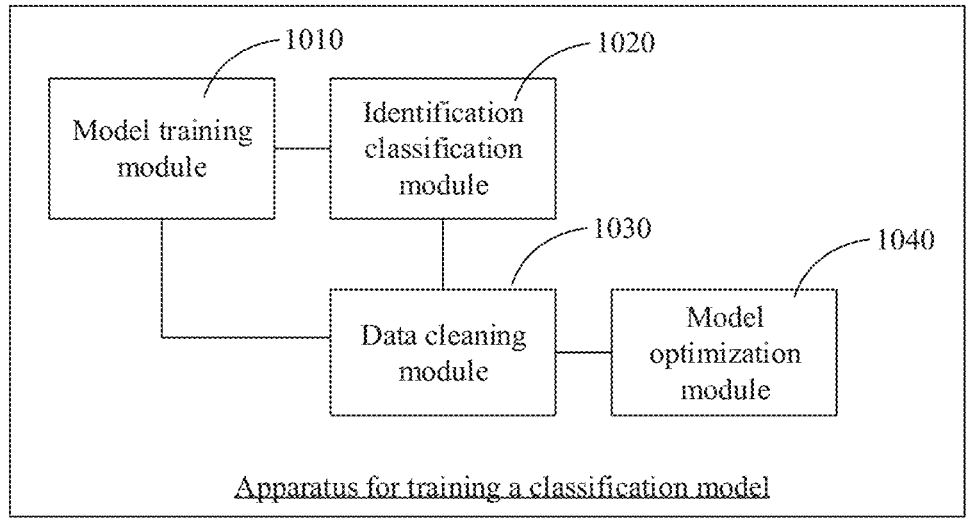
FIG. 10 is a structure block diagram of an image processing apparatus in one embodiment.

FIG. 10 is a structure block diagram of an apparatus for training a classification model in one embodiment. In one embodiment, the apparatus for training a classification model includes a model training module, an identification classification module, a data cleaning module, and a model optimization module.

The training module is configured to train a classification model based on a preset data set until the accuracy of the classification model reaches a standard value, data in the preset data set including label information.

The identification classification module is configured to identify each of the data in the preset data set based on the trained classification model to acquire category information of each of the data.

The data cleaning module is configured to clean, when the category information of the data is not matched with the label information, the data to acquire a target data set.

The model optimization module is configured to train the classification model again based on the target data set.

According to the apparatus for training a classification model, a classification model can be trained based on a preset data set until the accuracy of the classification model reaches a standard value, data in the preset data set including label information; each of the data in the preset data set is identified based on the trained classification model to acquire category information of each of the data; when the category information of the data is not matched with the label information, the data is cleaned to acquire a cleaned target data set; and the classification model is trained again based on the target data set. The quality of each of the data in a target data set may be ensured based on a semi-automatic cleaning mode, so that data quality does not need to be ensured by a multi-level manual review mechanism, thereby greatly saving labor costs, and improving data cleaning efficiency. Moreover, a classification model is trained based on the target data set, so that the accuracy and performance of the classification model can be improved.

In one embodiment, the data cleaning module may include a first verification unit, a first cleaning unit and a first forming unit.

The first verification unit is configured to verify the correctness of the label information when the category information of the data is not matched with the label information.

The first cleaning unit is configured to correct, when the label information is not correct, the label information to clean the data.

The first forming unit is configured to form the target data set based on the cleaned data.

In one embodiment, the data cleaning module may include a second verification unit, a second cleaning unit and a second forming unit.

The second verification unit is configured to verify the correctness of the category information when the category information of the data is not matched with the label information.

The second cleaning unit is configured to, when the label information is not correct, delete the data or add new data including the label information to clean the data.

The second forming unit is configured to form the target data set based on the cleaned data.

Further, when the category information of the data is not matched with the label information, the priority of verifying the label information is higher than the priority of verifying the category information.

In one embodiment, the model training module may include an acquisition unit, a processing unit, a weighting unit, an adjustment unit and a test unit.

The acquisition unit is configured to acquire the preset data set, and divide the preset data set to form a training set and a test set.

The processing unit is configured to input the training set including the label information into the neural network model, perform feature extraction through a basic network layer of the neural network model, input extracted image features into a classification network layer and a target detection network layer, obtain, in the classification network layer, a first loss function reflecting a difference between a first prediction confidence of a specified image category to which a background image in the data belongs and a first true confidence, and obtain, in the target detection network layer, a second loss function reflecting a difference between a second prediction confidence of a specified object category to which a foreground target in the data belongs and a second true confidence.

The weighting unit is configured to perform weighted summation on the first loss function and the second loss function to obtain a target loss function.

The adjustment unit is configured to adjust parameters of the neural network model based on the target loss function.

The test unit is configured to test the test set based on the repeatedly adjusted neural network model until the accuracy of the neural network model reaches the standard value.

In one embodiment, the acquisition unit may be further configured to: acquire, based on a learning task, a first data set having a first preset quantity and including label information; train a classification model on the first data set, and evaluate the accuracy of the classification model; screen, when the accuracy does not reach a preset value, unlabeled data based on the trained classification model, and merge the screened data to the first data set to form a second data set; and clean data in the second data set to form a preset data set, the data quantity of the second data set being greater than or equal to the data quantity of the preset data set.

In one embodiment, the apparatus for training a classification model may further include a determining module and a cleaning module.

The determining module is configured to acquire the accuracy of the classification model trained again to determine whether data cleaning is effective.

The cleaning module is configured to repeatedly clean, when the data cleaning is effective, the data of the preset data set until the accuracy of the classification model reaches a target value.

The division of each module in the above apparatus for training a classification model is only for illustration, and in other embodiments, a neural network model processing apparatus or an image processing apparatus may be divided into different modules as needed to complete all or some functions of the above apparatus for training a classification model.

An embodiment of the present application also provides a mobile terminal. The mobile terminal includes a memory and a processor. The memory may store a computer program. When the computer program is executed by the processor, the processor is enabled to perform the steps of the method for training a classification model.

An embodiment of the present application also provides a computer-readable storage medium. A computer-readable storage medium has a computer program stored thereon, the computer program, when executed by a processor, being capable of implementing the steps of the method for training a classification model.

Figure 11:
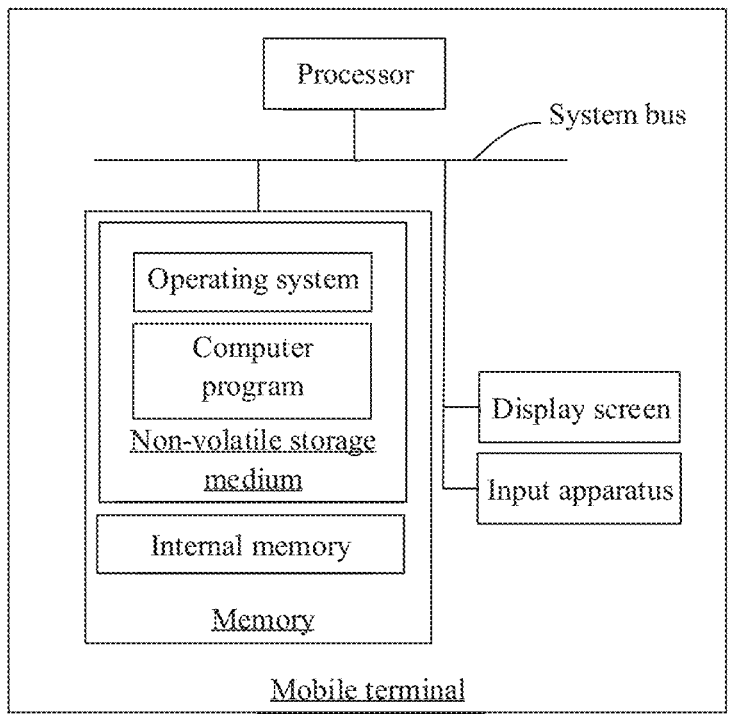
FIG. 11 schematically shows an internal structure diagram of a mobile terminal in one embodiment.

FIG. 11 schematically shows an internal structure diagram of a mobile terminal in one embodiment. As shown in FIG. 11, the mobile terminal includes a processor, a memory and a network interface, which are connected with each other through a system bus. The processor is configured to provide computing and control capabilities for supporting the operation of the entire mobile terminal. The memory is configured to store data, programs, or the like. The memory may store at least one computer program, and the computer program may be executed by the processor to implement a wireless network communication method applied to the mobile terminal provided in the embodiments of the present application. The memory may include a non-volatile storage medium and an internal memory. The non-volatile storage medium may store an operating system and a computer program. The computer program may be executed by the processor to implement the method for training a classification model provided in each of the above embodiments. The internal memory may provide a cache operation environment for the operating system and the computer program in the non-volatile storage medium. The network interface may be an Ethernet card or a wireless network card for communicating with an external mobile terminal. The mobile terminal may be a mobile phone, a tablet, a personal digital assistant, a wearable device, or the like.

Each module in the apparatus for training a classification model provided in the embodiments of the present application may be implemented in the form of a computer program. The computer program may operate on a mobile terminal or a server. A program module formed by the computer program may be stored on the memory of the mobile terminal or the server. The computer program may be executed by a processor to implement the steps of the method described in the embodiments of the present application.

A computer program product including an instruction is provided. When the computer program product operates on a computer, the computer is enabled to perform the method for training a classification model.

Figure 12:
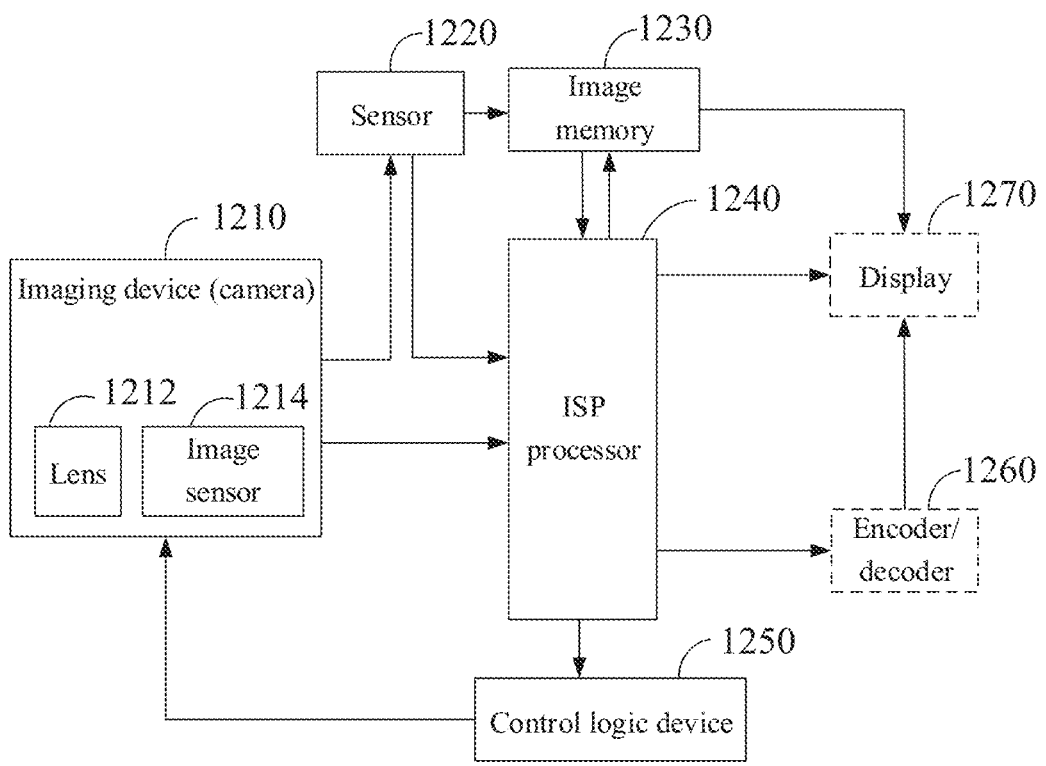
FIG. 12 schematically shows a diagram of an image processing circuit in one embodiment.

The embodiment of the present application also provides a mobile terminal. The mobile terminal may include an image processing circuit, and the image processing circuit may be implemented by hardware and/or software components, and may include various processing units defining an Image Signal Processing (ISP) pipeline. FIG. 12 schematically shows a diagram of an image processing circuit in one embodiment. As shown in FIG. 12, for convenience of explanation, only various aspects of the image processing technology related to the embodiment of the present application are shown.

As shown in FIG. 12, the image processing circuit includes an ISP processor 1240 and a control logic device 1250. Image data captured by an imaging device 1210 is first processed by the ISP processor 1240, and the ISP processor 1240 analyzes the image data to capture image statistics information that can be used to determine one or more control parameters of the imaging device 1210. The imaging device 1210 may include a camera having one or more lenses 1212 and image sensors 1214. The image sensor 1214 may include a color filter array (for example, a Bayer filter). The first image sensor 1214 may acquire light intensity and wavelength information captured by each of the imaging pixels in the image sensor 1214 and provide a set of original image data that can be processed by the ISP processor 1240. A sensor 1220 (for example, a gyroscope) may provide captured image processing parameters (for example, anti-shake parameters) for the ISP processor 1240 based on the interface type of a sensor 1220. The interface of the sensor 1220 may be a Standard Mobile Imaging Architecture (SMIA) interface, other serial or parallel camera interfaces, or a combination of the above interfaces.

In addition, the image sensor 1214 may also send original image data to the sensor 1220. The sensor 1220 may provide the original image data for the ISP processor 1240 based on the interface type of the sensor 1220, or the sensor 1220 may store the original image data into an image memory 1230.

The ISP processor 1240 may process the original image data pixel by pixel in a variety of formats. For example, each image pixel may have a bit depth of 8, 10, 12, or 14 bits, and the ISP processor 1240 may perform one or more image processing operations on the original image data, and may collect statistical information about the image data. The image processing operation may be performed according to the same or different bit depths.

The ISP processor 1240 may also receive image data from the image memory 1230. For example, the original image data may be sent to the image memory 1230 by the interface of the sensor 1220, and the original image data in the image memory 1230 is then provided for the ISP processor 1240 for processing. The image memory 1230 may be part of a memory apparatus, a storage device, or a separate dedicated memory within a mobile terminal, and may include Direct Memory Access (DMA) features.

When receiving the original image data from the interface of the image sensor 1214 or from the interface of the sensor 1220 or from the image memory 1230, the ISP processor 1240 may perform one or more image processing operations, such as time domain filtering. The processed image data may be sent to the image memory 1230 for additional processing prior to being displayed. The ISP processor 1240 may receive processed data from the image memory 1230 and perform image data processing on the processed data in an original domain and in RGB and YCbCr color spaces. The image data processed by the ISP processor 1240 may be output to a display 1270, so as to be viewed by a user and/or further processed by a Graphics Processing Unit (GPU). Additionally, the output data of the ISP processor 1240 may also be sent to the image memory 1230, and the display 1270 may read image data from the image memory 1230. In one embodiment, the image memory 1230 may be configured to implement one or more frame buffers. Additionally, the output data of the ISP processor 1240 may be sent to an encoder/decoder 1260 to encode/decode image data. The encoded image data may be saved and decompressed before being displayed on the display 1270. The encoder/decoder 1260 may be implemented by a CPU or GPU or coprocessor.

Statistical data determined by the ISP processor 1240 may be sent to a control logic 1250 unit. For example, the statistical data may include statistical information of the image sensor 1214, such as auto exposure, auto white balance, auto focus, flicker detection, black level compensation, and second lens 1212 shading correction. The control logic device 1250 may include a processor and/or a micro controller unit capable of executing one or more routines such as firmware), and one or more routines may determine control parameters of the imaging device 1210 and control parameters of the ISP processor 1240 according to the received statistical data. For example, the control parameters of the imaging device 1210 may include control parameters of the sensor 1220 (such as gain, integration time of exposure control, and anti-shake parameters), control parameters of camera flash, control parameters of lens 1212 (such as focal length for zoom or focus), or a combination of these parameters, etc. The ISP control parameters may include a gain level and a color correction matrix for automatic white balance and color adjustment (e.g., during RGB processing), and a lens 1212 shading correction parameter.

The steps of the method for training a classification model are implemented below with an image processing technology in FIG. 12.

Any reference used in the present application to a memory, storage, a database or other media may include non-volatile and/or volatile memories. The appropriate non-volatile memory may include a ROM, a Programmable ROM (PROM), an Electrically Programmable ROM (EPROM), an Electrically Erasable Programmable ROM (EEPROM), or a flash memory. The volatile memory may include a RAM, used as an external cache memory. As being illustrative instead of being limitative, the RAM may have multiple forms such as a Static RAM (SRAM), a Dynamic RAM (DRAM), a Synchronous DRAM (SDRAM), a Dual Data Rate SDRAM (DDR SDRAM), an Enhanced SDRAM (ESDRAM), a Synchlink DRAM (SLDRAM), a Rambus Direct RAM (RDRAM), a Direct Rambus Dynamic RAM (DRDRAM), and a Rambus Dynamic RAM (RDRAM).

The above embodiment only describes several implementation manners of the present application more specifically and in more detail, but cannot be thus understood as limitation to the patent scope of the present application. It is to be pointed out that those of ordinary skill in the art may also make several variations and improvements without departing from the concept of the present application. These variations and improvements fall within the scope of protection of the present application. Therefore, the scope of protection of the present application should be determined by the appended claims.

The invention claimed is:

1. A method for training a classification model, comprising:
   training a classification model based on a preset data set until accuracy of the classification model reaches a standard value;
   identifying data in the preset data set based on the trained classification model to acquire category information of the data, the data in the preset data set comprising label information, wherein the label information is manually filtered and labeled when the preset data set is formed, and the label information includes at least one of an image category or an object category;
   comparing the category information of the data with the label information to determine whether the category information of the data is matched with the label information;

after determining the category information of the data is not matched with the label information, correcting the label information to clean the data to acquire a target data set based on a semi-automatic cleaning mode; and
retraining the classification model based on the target data set.

2. The method according to claim 1, wherein after determining the category information of the data is not matched with the label information, correcting the label information to clean the data to acquire the cleaned target data set comprises:
verifying correctness of the label information when the category information of the data is not matched with the label information;
correcting, in response to that the label information is not correct, the label information to clean the data; and
forming the target data set based on the cleaned data.

3. The method according to claim 1, wherein after determining the category information of the data is not matched with the label information, correcting the label information to clean the data to acquire the cleaned target data set comprises:
verifying correctness of the label information when the category information of the data is not matched with the label information;
deleting, in response to that the label information is not correct, the data or adding new data including the label information to clean the data; and
forming the target data set based on the cleaned data.

4. The method according to claim 3, further comprising:
verifying correctness of the category information after verifying correctness of the label information when the category information of the data is not matched with the label information.

5. The method according to claim 1, wherein the classification model is a neural network model; and
training the classification model based on the preset data set until the accuracy of the classification model reaches the standard value comprises:
acquiring the preset data set, and dividing the preset data set to form a training set and a test set;
inputting the training set including the label information to the neural network model, performing feature extraction through a basic network layer of the neural network model;
inputting an extracted image feature into a classification network layer and a target detection network layer;
obtaining, in the classification network layer, a first loss function reflecting a difference between a first prediction confidence of a specified image category to which a background image in the data belongs and a first true confidence;
obtaining, in the target detection network layer, a second loss function reflecting a difference between a second prediction confidence of a specified object category to which a foreground target in the data belongs and a second true confidence;
performing weighted summation on the first loss function and the second loss function to obtain a target loss function;
adjusting a parameter of the neural network model based on the target loss function; and
testing the test set based on the neural network model repeatedly adjusted, until the accuracy of the neural network model reaches the standard value.

6. The method according to claim 5, wherein acquiring the preset data set comprises:
acquiring, based on a learning task, a first data set having a first preset quantity and comprising label information;
training the classification model on the first data set, and evaluating the accuracy of the classification model;
screening, when the accuracy does not reach a preset value, unlabeled data based on the trained classification model, and merging the screened data to the first data set to form a second data set; and
performing data cleaning in the second data set to form the preset data set, a data quantity of the second data set being greater than or equal to a data quantity of the preset data set.

7. The method according to claim 1, further comprising:
acquiring the accuracy of the classification model trained to determine whether data cleaning is effective or not; and
cleaning, when the data cleaning is effective, the data of the preset data set until the accuracy of the classification model reaches a target value.

8. An apparatus for training a classification model, comprising:
a memory for storing a computer program, and
a processor capable of executing the computer program to implement steps of:
training a classification model based on a preset data set until accuracy of the classification model reaches a standard value;
identifying data in the preset data set based on the trained classification model to acquire category information of the data, the data in the preset data set comprising label information, wherein the label information is manually filtered and labeled when the preset data set is formed, and the label information includes at least one of an image category or an object category;
comparing the category information of the data with the label information to determine whether the category information of the data is matched with the label information;
after determining the category information of the data is not matched with the label information, correcting the label information to clean the data to acquire a target data set based on a semi-automatic cleaning mode; and
retraining the classification model based on the target data set.

9. The apparatus of claim 8, wherein the processor is capable of executing the computer program to further implement steps of:
verifying correctness of the label information when the category information of the data is not matched with the label information;
correcting, in response to that the label information is not correct, the label information to clean the data; and
forming the target data set based on the cleaned data.

10. The apparatus of claim 8, wherein the processor is capable of executing the computer program to further implement steps of:
verifying correctness of the label information when the category information of the data is not matched with the label information;
deleting, in response to that the label information is not correct, the data or adding new data including the label information to clean the data; and
forming the target data set based on the cleaned data.

11. The apparatus of claim 10, wherein the processor is capable of executing the computer program to further implement steps of:
  verifying correctness of the category information after verifying correctness of the label information when the category information of the data is not matched with the label information.

12. The apparatus of claim 8, wherein the classification model is a neural network model; and
  the processor is capable of executing the computer program to further implement steps of:
    acquiring the preset data set, and dividing the preset data set to form a training set and a test set;
    inputting the training set including the label information to the neural network model, performing feature extraction through a basic network layer of the neural network model;
    inputting an extracted image feature into a classification network layer and a target detection network layer;
    obtaining, in the classification network layer, a first loss function reflecting a difference between a first prediction confidence of a specified image category to which a background image in the data belongs and a first true confidence;
    obtaining, in the target detection network layer, a second loss function reflecting a difference between a second prediction confidence of a specified object category to which a foreground target in the data belongs and a second true confidence;
    performing weighted summation on the first loss function and the second loss function to obtain a target loss function;
    adjusting a parameter of the neural network model based on the target loss function; and
    testing the test set based on the neural network model repeatedly adjusted, until the accuracy of the neural network model reaches the standard value.

13. The apparatus of claim 12, wherein the processor is capable of executing the computer program to further implement steps of:
  acquiring, based on a learning task, a first data set having a first preset quantity and comprising label information;
  training the classification model on the first data set, and evaluating the accuracy of the classification model;
  screening, when the accuracy does not reach a preset value, unlabeled data based on the trained classification model, and merging the screened data to the first data set to form a second data set; and
  performing data cleaning in the second data set to form the preset data set, a data quantity of the second data set being greater than or equal to a data quantity of the preset data set.

14. The apparatus of claim 8, wherein the processor is capable of executing the computer program to further implement steps of:
  acquiring the accuracy of the classification model trained to determine whether data cleaning is effective or not; and
  cleaning, when the data cleaning is effective, the data of the preset data set until the accuracy of the classification model reaches a target value.

15. A mobile terminal, comprising the apparatus of claim 8.

16. A non-transitory computer-readable storage medium, having a computer program stored thereon, wherein the computer program is executable by a processor to implement the steps of the method of claim 1.

* * * * *